July 1, 1924.
G. A. GEMMER
VEHICLE SPRING
Filed July 17, 1922
1,499,768
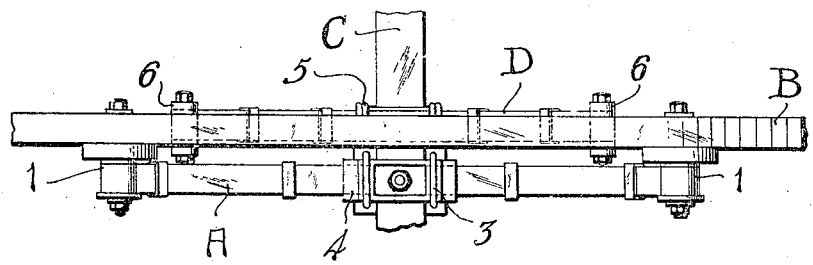
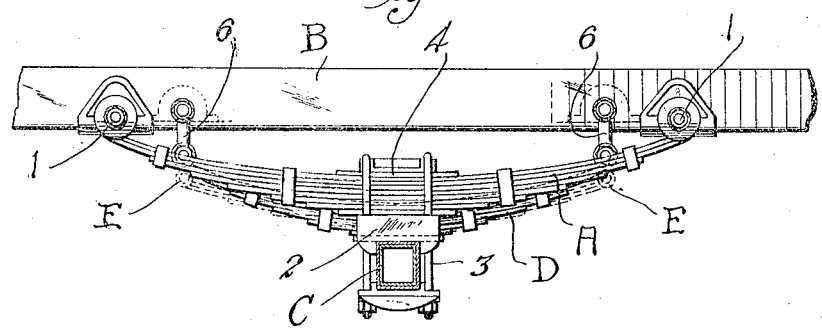
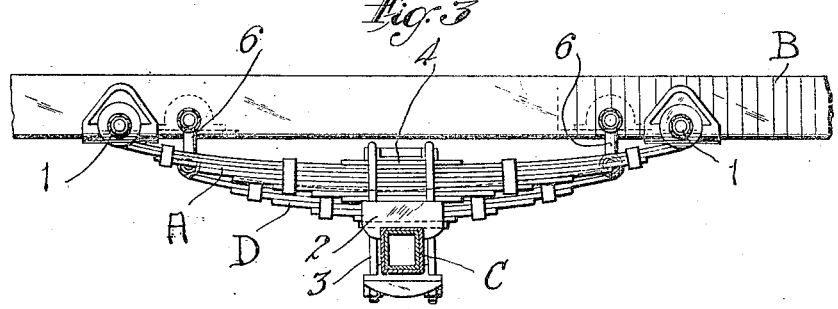
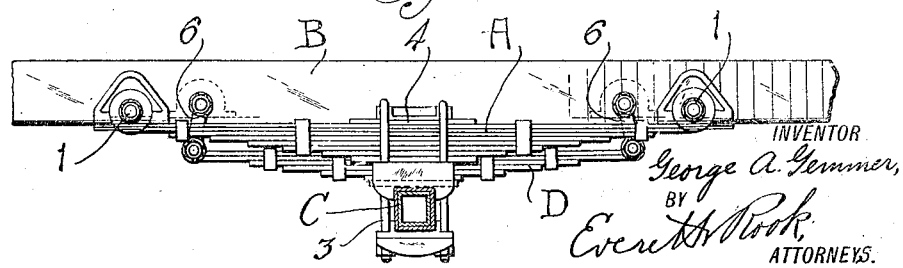
INVENTOR
George A. Gemmer,
BY
Everett H. Rook,
ATTORNEYS.

Patented July 1, 1924.

1,499,768

UNITED STATES PATENT OFFICE.

GEORGE A. GEMMER, OF NEWARK, NEW JERSEY.

VEHICLE SPRING.

Application filed July 17, 1922. Serial No. 575,470.

*To all whom it may concern:*

Be it known that I, GEORGE A. GEMMER, a citizen of the United States, and a resident of Newark, in the county of Essex and State of New Jersey, have invented new and useful Improvements in Vehicle Springs, of which the following is a specification.

This invention relates in general to a spring construction for vehicles, and more particularly for motor trucks.

The primary object of the invention is to provide an improved vehicle spring construction including a main spring adapted to support a full load on the vehicle, and an auxiliary spring to cooperate with said main spring to assist in preventing rebound and supporting excessive loads.

Further objects are to provide a spring construction of the character described embodying a novel and improved arrangement of a main spring and an auxiliary spring and connection of said springs to the relatively movable members such as the vehicle chassis and the axle, whereby the auxiliary spring cooperates with said main spring both to prevent rebound thereof when there is less than a predetermined load on the main spring and to assist the main spring in supporting a load greater than said predetermined load, and to obtain other results and advantages as may be brought out by the following description.

Referring to the accompanying drawings, in which like numerals of reference indicate the same parts throughout the several views, Figure 1 is a top plan view of a vehicle spring construction embodying my invention for the left-hand side of a motor truck, showing a portion of the axle and the side bar of the chassis or frame;

Figure 2 is a side elevation showing the positions of the springs when there is no load on the truck;

Figure 3 is a similar view showing the positions of the springs when the truck is loaded to about one-third its capacity, and Figure 4 is a side elevation showing the positions of the springs with the truck carrying a full load.

In the embodiment of the invention shown on the drawings, the reference character A designates the main spring which is shown of the well-known leaf construction and which may be coupled at its ends to the chassis or frame B of the truck in any well-known manner, as indicated at 1. The said main spring is mounted substantially centrally of its length upon a block 2 on the axle C and secured to the axle by means of the well-known U-bolts 3.

An auxiliary spring D of leaf construction is arranged on the axle C at one side of the main spring A and substantially beneath the side bar B of the chassis, said spring being secured intermediate its ends to the axle C in a suitable known manner by means of U-bolts 5 but without a rebound plate. The auxiliary spring when applied to the vehicle is cambered or has its ends flexed upwardly from the neutral position, indicated by dotted lines at E in Figure 2, and connected by shackles 6 to the side bar B of the chassis, as indicated by solid lines in Figure 2. Thus, when there is no load on the truck, the auxiliary spring exerts a pressure or places a load on the main spring A and thereby assists in preventing rebound of the main spring.

When the truck is loaded to about one-third its capacity, the main spring A and the chassis are depressed so that the auxiliary spring D is in its neutral position, as shown on Figure 3 and as indicated by dotted lines on Figure 2, so that it exerts no load on the main spring. Upon the addition of further load to the truck, the main spring and chassis are further depressed so that the auxiliary spring begins to assume or support a part of the load, and when the truck is loaded to its full capacity both the main spring and auxiliary spring are substantially flat or straight, as shown by Figure 4. The auxiliary spring thus assists the main spring in supporting the load and reenforces the main spring when the truck is overloaded.

While I have shown a spring construction for only one side of a vehicle, it will be understood that there is a corresponding arrangement of the springs at the other side. Also, while I have shown one embodiment of my invention including certain details of construction, it will be understood that this is only for the purpose of illustrating the principles of the invention, and that many modifications and changes can be made in the details of construction and arrangement of the parts without departing from the spirit or scope of the invention. Furthermore, while the construction has been shown particularly for motor trucks, the invention is susceptible of utilization for other purposes, when desired, for instance, with any pair of members either of which is movable toward the other. Therefore, I do not desire to be understood as restricting myself in the construction and use of the invention, except as required by the following claims when construed in the light of the prior art.

Having thus described the invention, what I claim is:

1. In a spring construction, the combination of a pair of members one of which is movable toward and from the other, a main leaf spring connected at its ends to one of said members and substantially centrally of its length to the other to yieldingly hold said members in spaced relation, and an auxiliary leaf spring connected at its ends to said first-mentioned member and substantially centrally of its length to said second-mentioned member and tending to draw said members together against the influence of said main spring, said auxiliary spring gradually decreasing its said influence on said members for a portion of the movement of either toward the other and then cooperating with said main spring to yieldingly resist further movement of either of said members toward the other.

2. In a vehicle spring, the combination with a chassis and an axle, of a main leaf spring connected substantially centrally of its length to said axle and at its ends to said chassis, said main spring being adapted to support a predetermined load on the vehicle, and an auxiliary spring connected substantially centrally of its length to said axle at one side of said main spring and at its ends to said chassis, said auxiliary spring exerting a load on said main spring to prevent rebound when the vehicle carries no load and gradually decreasing its said influence on said main spring as load is added until a predetermined portion of the full load of the vehicle is applied, said auxiliary spring then cooperating with said main spring to support the said load.

GEORGE A. GEMMER.